United States Patent
Matsuo et al.

(10) Patent No.: US 9,247,410 B1
(45) Date of Patent: Jan. 26, 2016

(54) POWER MANAGEMENT FOR EMERGENCY COMMUNICATIONS DEVICE

(71) Applicant: GreatCall, Inc., San Diego, CA (US)

(72) Inventors: Kotaro Matsuo, San Diego, CA (US); Joel Stair, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

(21) Appl. No.: 14/563,918

(22) Filed: Dec. 8, 2014

(51) Int. Cl.
*H04W 52/02* (2009.01)
*H04W 4/22* (2009.01)
*H04M 1/725* (2006.01)
*H04W 4/02* (2009.01)

(52) U.S. Cl.
CPC ............ *H04W 4/22* (2013.01); *H04M 1/72541* (2013.01); *H04M 1/72577* (2013.01); *H04W 4/02* (2013.01); *H04W 52/027* (2013.01); *H04W 52/0251* (2013.01); *H04W 52/0254* (2013.01)

(58) Field of Classification Search
CPC ..................................................... H04W 52/02
See application file for complete search history.

(56) References Cited

U.S. PATENT DOCUMENTS

| 6,067,045 | A * | 5/2000 | Castelloe | G01S 5/02 342/357.43 |
| 8,270,939 | B2 | 9/2012 | Imming et al. | |
| 8,380,162 | B2 | 2/2013 | Matsuo et al. | |
| 2007/0091836 | A1* | 4/2007 | Oprescu-Surcobe | H04W 52/0225 370/318 |
| 2009/0098914 | A1* | 4/2009 | Martin-Cocher | H04W 52/0261 455/572 |
| 2010/0080366 | A1* | 4/2010 | Anglin | H04M 1/6505 379/88.22 |
| 2010/0273486 | A1* | 10/2010 | Kharia | H04W 52/0261 455/436 |
| 2012/0115430 | A1* | 5/2012 | Hawkes | H04M 1/72536 455/404.1 |
| 2012/0295574 | A1* | 11/2012 | Chen | H02J 1/14 455/404.1 |
| 2013/0150026 | A1* | 6/2013 | Ekici | H04W 48/18 455/426.1 |
| 2014/0106782 | A1* | 4/2014 | Chitre | H04W 4/22 455/456.2 |
| 2014/0194095 | A1* | 7/2014 | Wynne | H04W 4/12 455/411 |
| 2014/0274225 | A1* | 9/2014 | Lacatus | H04W 24/08 455/574 |
| 2014/0335846 | A1* | 11/2014 | Wilson | H04K 3/65 455/418 |
| 2015/0065170 | A1* | 3/2015 | Brisebois | H04W 4/04 455/456.3 |

* cited by examiner

*Primary Examiner* — Vladimir Magloire
*Assistant Examiner* — Frank Donado
(74) *Attorney, Agent, or Firm* — Kilpatrick Townsend & Stockton LLP

(57) ABSTRACT

Systems and methods of conserving power in a mobile emergency communication device. After placing a telephone call, the calling device communicates information to the call recipient, for example a response center, usable to estimate the remaining talk time of the calling device. The call recipient sends instructions to the calling device to turn off, disable, or suspend certain device capabilities to conserve battery power in the calling device. For example, if it is determined that the device is not moving, a geographical location capability of the device may be turned off to conserve power. Other capabilities may also be turned off, for example a secondary radio transceiver, a display screen or other visual indicator, certain software applications executing on the device, or other capabilities.

18 Claims, 7 Drawing Sheets

POWER MANAGEMENT FOR EMERGENCY COMMUNICATIONS DEVICE

BACKGROUND OF THE INVENTION

Mobile personal emergency response systems (MPERS) have become increasingly popular. In an MPERS system, a user is typically client enrolled in an assistance service offered by a service provider. The client may wear or carry a mobile device that can quickly and conveniently place a telephone call to a response center staffed with customer service representatives who can assist the client in various ways, for example by providing directions, answering basic medical questions, contacting family members or other designated contacts to provide additional assistance, or calling official emergency services personnel if the user is in immediate danger.

It is highly desirable that interruptions in contact between clients and the response center be avoided.

BRIEF SUMMARY OF THE INVENTION

According to one aspect, a method of operating a mobile communications device comprises receiving from a user of the mobile communications device an indication that the mobile communications device is to place a telephone call to a particular recipient via a mobile telephone network. The mobile communications device places the telephone call to the particular recipient via the mobile telephone network. The method further comprises automatically evaluating a battery charge level of the mobile communications device and transmitting an indication of the battery charge level to the recipient of the telephone call via the mobile telephone network. In some embodiments, the indication that the mobile communications device is to place a telephone call to a particular recipient is the press of a single button on the mobile communications device. In some embodiments, the method further comprises receiving, from the recipient of the telephone call via the mobile telephone network, an instruction to turn off one or more specified capabilities of the mobile communications device; and in response to the received instruction, turning off the one or more specified capabilities. In some embodiments, the method further comprises automatically evaluating a transmit power being used by the mobile communications device to communicate via the mobile telephone network, and transmitting an indication of the transmit power to the recipient of the telephone call via the mobile telephone network. In some embodiments, turning off the one or more specified capabilities comprises turning off a geographical location capability of the mobile communications device. In some embodiments, the method further comprises, before turning off the geographical location capability of the mobile communications device, ascertaining the geographical location of the mobile communications device, and transmitting to the recipient of the telephone call an indication of the geographical location of the mobile communications device. In some embodiments, turning off the one or more specified capabilities comprises turning off a visual display of the mobile communications device. In some embodiments, turning off the one or more specified capabilities comprises turning off a radio transceiver other than a mobile telephone transceiver being used to communicate via the mobile telephone network. In some embodiments, turning off the one or more specified capabilities comprises terminating or suspending at least one application executing on a processor of the mobile communications device. In some embodiments, the method further comprises transmitting to the recipient of the telephone call a list of one or more application programs being executed by the processor of the mobile communications device.

According to another aspect, a method of operating a mobile communications device comprises receiving from a user of the mobile communications device an indication that the mobile communications device is to place a telephone call to a particular recipient via a mobile telephone network, and placing the telephone call to the particular recipient via the mobile telephone network. The method further includes ascertaining the geographical location of the mobile communications device, transmitting to the recipient of the telephone call an indication of the geographical location of the mobile communications device, automatically recognizing that the mobile communications device is not moving, and in response to the recognition that the mobile communications device is not moving, automatically turning off a geographical location capability of the mobile communications device. In some embodiments, the method further comprises reactivating the geographical location capability of the mobile communications device, re-evaluating whether the mobile communications device is in motion, and when the mobile communications device is in motion, ascertaining an updated geographical location of the mobile communications device and transmitting to the recipient of the telephone call an indication of the updated geographical location of the mobile communications device.

According to another aspect, a method of operating a call center comprises receiving a telephone call from a mobile communications device via a mobile telephone network; receiving from the mobile communications device an indication of a battery charge level of the mobile communications device; receiving from the mobile communications device an indication of a transmit power being used by the mobile communications device to communicate via the mobile telephone network; estimating, from the battery charge level indication and the transmit power indication, an amount of time the mobile communications device can sustain the telephone call without running out of power; and transmitting an instruction to the mobile communications device via the mobile telephone network to turn off one or more capabilities of the mobile communications device. The method may further comprise estimating a required duration of the telephone call. In some embodiments, the method further comprises comparing the estimated required duration with the estimated amount of time the mobile communications device can sustain the telephone call, wherein the instruction to turn off one or more capabilities of the mobile communications device is transmitted when the estimated required duration exceeds the estimated amount of time the mobile communications device can sustain the telephone call. In some embodiments, the method further comprises receiving from the mobile communications device an indication of the geographical location of the mobile communications device; and receiving from the mobile communications device via the mobile telephone network information usable to ascertain whether the mobile communications device is in motion; wherein transmitting an instruction to the mobile communications device via the mobile telephone network to turn off one or more capabilities of the mobile communications device comprises transmitting an instruction to the mobile communications device to turn off a geographical location capability of the mobile communications device. In some embodiments, transmitting an instruction to the mobile communications device via the mobile telephone network to turn off one or more capabilities of the mobile communications device comprises transmitting an instruction to the mobile communications device to turn off a visual display of the mobile communications device. In some embodiments, transmitting an instruction to the mobile communications device via the mobile telephone network to turn off one or more capabilities of the mobile communications device comprises transmitting an instruction to the mobile communications device to turn off a radio transceiver other than a mobile telephone transceiver being used to communicate via the mobile telephone network. In some embodiments, transmitting an instruction to the mobile communications device via the mobile telephone network to turn off one or more capabilities of the mobile communications device comprises transmitting an instruction to the mobile communications device to terminate or suspend at least one application executing on a processor of the mobile communications device. In some embodiments, the method further comprises receiving from the mobile communications device via the mobile telephone network a list of one or more application programs being executed by the processor of the mobile communications device.

According to another aspect, a method of operating a mobile communications device comprises receiving from a user of the mobile communications device an indication that the mobile communications device is to place a telephone call to a particular recipient via a mobile telephone network, and placing the telephone call to the particular recipient via the mobile telephone network. The method further comprises automatically estimating an amount of time the mobile communications device can sustain the telephone call without running out of power, and transmitting an indication of the amount of time to the recipient of the telephone call via the mobile telephone network. The method further comprises receiving, from the recipient of the telephone call via the mobile telephone network, an instruction to turn off one or more specified capabilities of the mobile communications device. In response to the received instruction, the one or more specified capabilities are turned off. In some embodiments, the method further comprises automatically evaluating a battery charge level of the mobile communications device; and automatically evaluating a transmit power being used by the mobile communications device to communicate via the mobile telephone network; wherein amount of time is estimated from the battery charge level and transmit power.

DETAILED DESCRIPTION OF THE INVENTION

Figure 1:
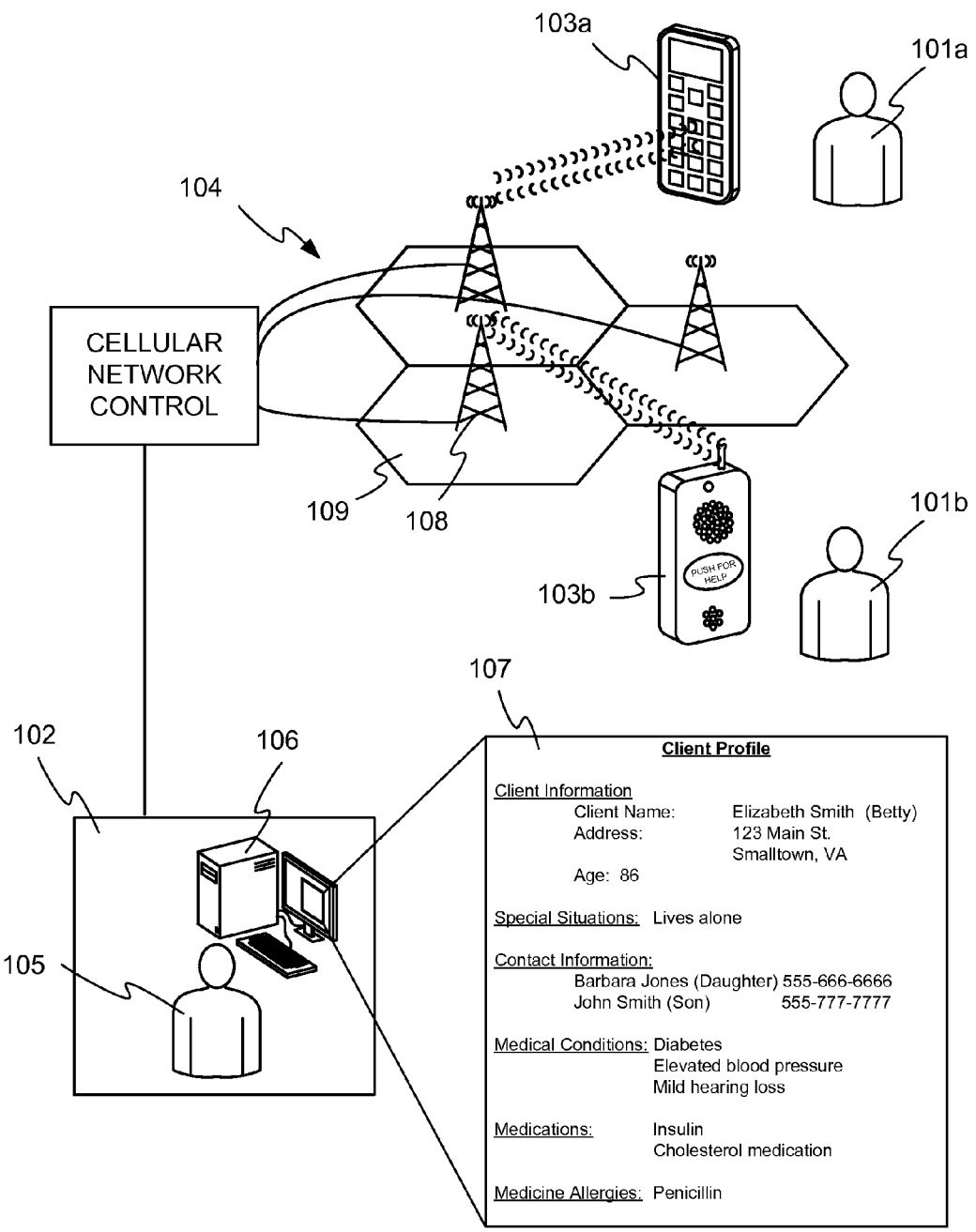
FIG. 1 illustrates an example system in which embodiments of the invention may be embodied.

FIG. 1 illustrates an example system in which embodiments of the invention may find utility. Clients or users 101a and 101b may subscribe to a service offered by a service provider who operates a response center 102, also called a call center. Clients 101a and 101b use mobile communications devices 103a and 103b to reach response center 102 via cellular telephone network 104.

For example, device 103a may be a fully featured "smart" cellular telephone having a processor, touchscreen display and the like, and capable of installing application software to add to the capabilities of device 103a. Device 103a is described in more detail below.

By contrast, device 103b used by client 101b may be a simplified communicator or "fob", having a simplified user interface, as is also described in more detail below.

In either event, using a device such as device 103a, 103b, or another kind of device, the client can initiate a telephone call to response center 102 and be connected with a customer service representative 105, who can provide assistance or marshal other resources for the benefit of the client.

Response center 102 includes a computer system 106 that may be used for various functions. For example, information about calls from clients may be displayed to customer service representative 105. Computer system 106 may store personal information gathered from clients that may be helpful in rendering assistance to the clients. Computer system 106 may also assist customer service representative 105 in the performance of his or her job, for example automating telephone dialing and the like. While computer system 106 is illustrated as a single computer, it will be recognized that the term "computer system" encompasses many different kind of installations, including systems of multiple computers linked together. The multiple computers may be co-located or widely dispersed.

Computer system 106 may store a personal profile of each client. For example, upon enrollment in the assistance service and occasionally thereafter, a client may provide information about his or her medical conditions, medications, and other information that may be helpful to customer service representative 105 in assisting the client. The client may also provide contact information for family members or other entities that can be contacted in the event of an emergency, or who are to be informed about the health and well-being of the client. This information may be collected and stored in the client's personal profile. An abbreviated example personal profile 107 is shown in FIG. 1. A respective personal profile such as personal profile 107 may be recalled and displayed to customer service representative 105 upon receipt of a client call, so that the answering customer service representative can immediately have access to information on the caller.

In one example scenario, the service provider that operates response center 102 may also be a cellular telephone service provider, and may offer a private assistance service as an adjunct to cellular telephone service. Response center 102 may be contacted through a phone number, speed dial or other shortcut, for example by activating a 5 and * key combination on a telephone. While FIG. 1 illustrates contacting response center 102 using cellular devices through cellular network 104, clients of response center 102 may reach response center 102 by other means as well, for example via conventional wire line telephone, using a voice-over-Internet-protocol (VOIP), or any other suitable connection method that enables a user to reach response center 102. Response center 102 may be reachable via multiple methods.

While embodiments of the invention are described primarily in the context of a private response center, the invention is not so limited and may be embodied in a public facility as well. In the case of a private service, response center 102 may not be intended to be a substitute for a public safety answering point. A client of the service offered by private response center 102 would be expected and encouraged to dial 9-1-1 to reach official emergency response personnel in the event of an emergency.

However, a client may call response center 102 during an emergency for any of a number of reasons. For example, the client may simply be more comfortable asking for assistance from response center 102 than with calling 9-1-1, or the client may be using a simplified portable device such as device 103*b* that calls response center 102 directly when actuated. Once customer service representative 105 recognizes that the client has a medical emergency, he or she can notify official emergency services personnel.

In either an emergency or non-emergency situation, customer service representative 105 may remain on the line until and after help arrives at the client's location. For example, customer service representative 105 may remain on the line after emergency services personnel arrive to provide information from the client's profile that may relate to the client's condition, or for other purposes. In another example, a client may call response center 102 in the event of an automobile breakdown. Response center 102 may arrange for a tow truck, and may stay on the line with the client until the tow truck arrives at the client's vehicle, to ensure that the situation is safely resolved.

While only a single customer service representative 105 is shown and discussed, it will be recognized that response center 102 may employ a large number of customer service representatives 105, who may enlist each other's help with particular calls received at response center 102. For example, it the scenario above, when the customer service representative 105 who is speaking directly with the calling client realizes that a tow truck is needed, another customer service representative may research towing services near the client's location and arrange for the tow truck while the first customer service representative 105 continues to talk with the calling client. It is to be understood that actions of a customer service representative discussed herein are intended to encompass actions taken by multiple customer service representatives working together. In some embodiments, customer service representative roles may be automated and performed, for example, by computer system 106.

Depending on the particular circumstances, some calls to response center 102 may be so long in duration that it becomes a concern whether the client's communication device will have sufficient battery charge to sustain the call until the situation that prompted the call can be safely resolved.

Embodiments of the invention provide devices and methods for monitoring and managing power usage by a mobile communication device, and may improve the chances of a device being able to sustain a call for an extended time. Thus, at least some interruptions in contact between clients and response center 102 that may otherwise have occurred may be avoided.

Figure 2A:
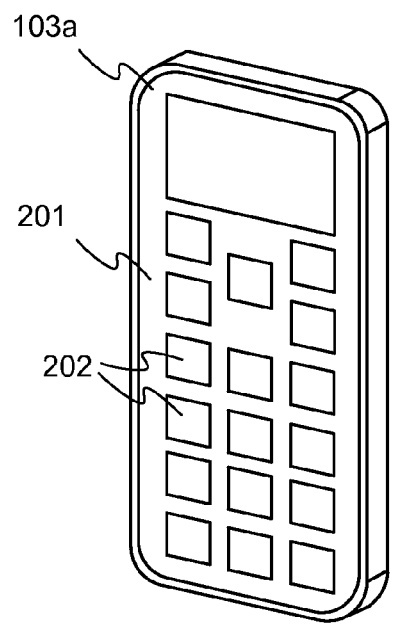
FIG. 2A illustrates an example cellular telephone, in accordance with embodiments of the invention.

FIG. 2A illustrates example cellular telephone 103*a* in more detail. Cellular telephone 103*a* may be a so-called "smart phone" or other similar device such as a tablet computer. Smart phone 103*a* includes complete cellular telephone capability, but may perform many other functions as well, for example running application programs that provide a host of capabilities. A touchscreen 201 or other kind of display may be provided, on which a keypad 202 may be emulated. Cellular telephone 103*a* also includes a microphone and speaker (not shown) for use as a telephone. In some embodiments, a call to response center 102 may be initiated by activating a software application on telephone 103*a*, for example by actuating a control in the user interface shown on touchscreen 201.

Figure 2B:
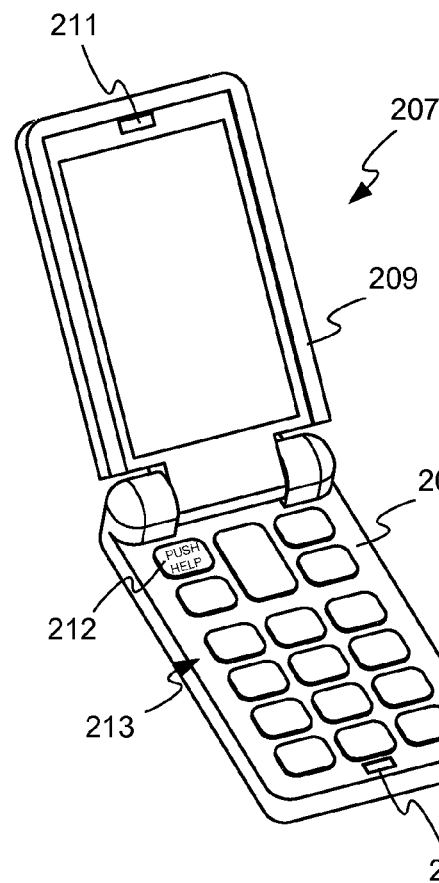
FIG. 2B illustrates another kind of mobile device usable in embodiments of the invention.

FIG. 2B illustrates another kind of mobile device 207 usable in embodiments of the invention. Device 207 is in the form of a "flip" phone, having a keypad portion 208 and a display portion 209 that swivel with respect to each other, so that the phone folds for storage and carrying, but unfolds for use. A microphone 210 and speaker 211 are conveniently positioned for telephone communication. A designated shortcut key 212 may be used to contact response center 102 directly, while keypad 213 enables calling other telephone numbers.

Figure 2C:
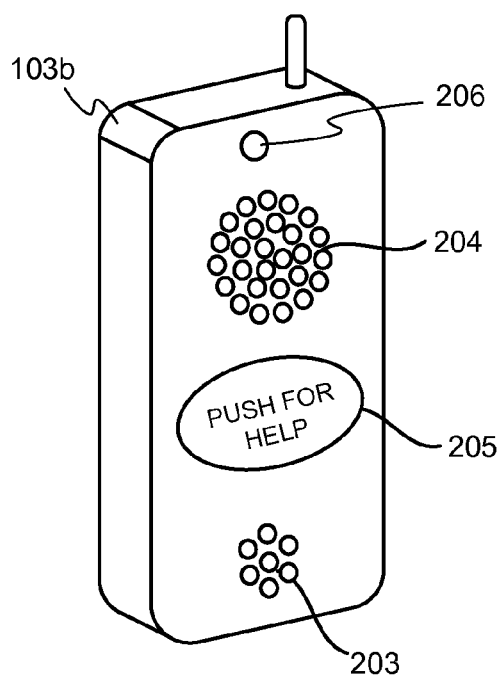
FIG. 2C illustrates an example simplified mobile communications device, in accordance with embodiments of the invention.

FIG. 2C illustrates simplified mobile communicator 103*b* in more detail. Simplified communicator 103*b* may be especially useful for some clients of response center 102. Example mobile communicator 103*b* may internally be a fully-featured cellular telephone, but has a simplified input interface comprising one button 205 for initiating a call directly to response center 102. Simplified communicator 103*b* may also be referred to as a "fob" or an "emergency communicator." For the purposes of this disclosure, the term "telephone" is intended to encompass mobile communicator 103*b*. A client of private response center 102 may wear simplified communicator 103*b* on his or her person, and can use it to contact private response center 102 whenever assistance is needed. For example, simplified communicator 103*b* may be configured to dial private response center 102 when button 205 is pressed. This greatly simplified input interface may be especially helpful to clients with impairments such as poor vision or coordination that make it difficult to operate a conventional cellular telephone that has many small keys. The single-button input interface assures that private response center 102 will be called without the client having to press a sequence of keys. In an event where help is needed, the client may be distraught or disoriented, and the simplified input interface increases the chance of the client reaching private response center 102. For the purpose of this disclosure, a user interface is "simplified" if does not provide for the dialing of arbitrary telephone numbers.

Simplified communicator 103*b* further includes a microphone 203 and a speaker 204, enabling telephone or telephone-like communication. In some embodiments, simplified communicator 103*b* does not include a display, although one may be included on which messages can be shown to the user. In some embodiments, simplified communicator 103*b* may include an indicator light 206 or other visual indicator. Indicator light 206 may be used, for example, to indicate that the device is active, connected on a call, or the like.

Figure 3:
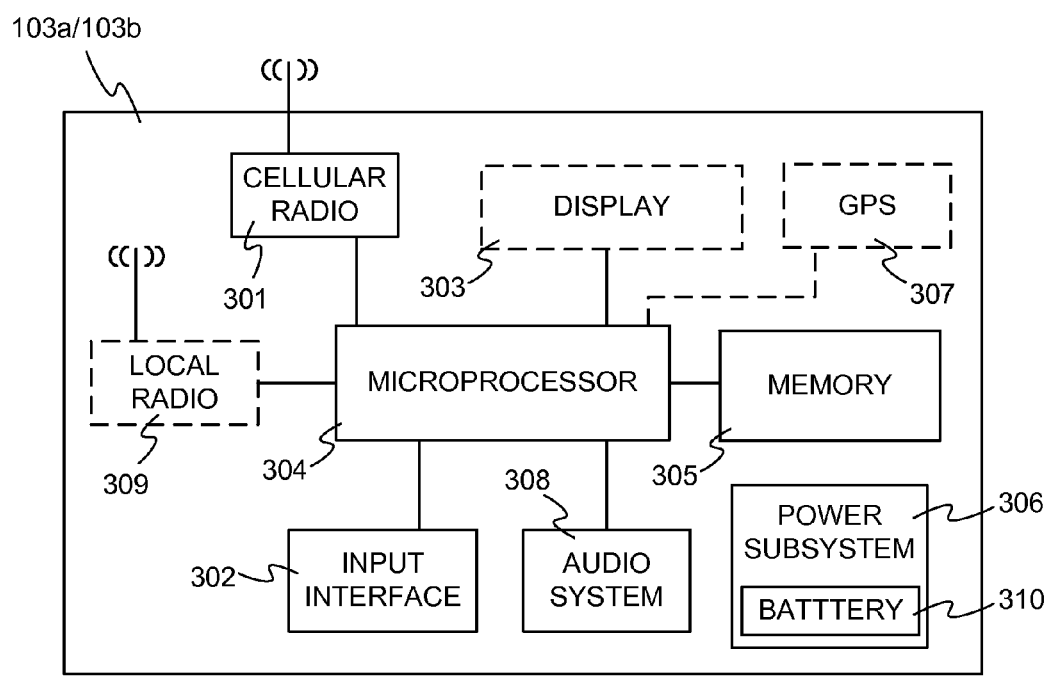
FIG. 3 illustrates a simplified block diagram of an example internal architecture of a mobile communications device suitable for use in embodiments.

FIG. 3 illustrates a simplified block diagram of an example internal architecture of a mobile communications device such as smart cellular telephone 103*a*, flip phone 207, or simplified communicator 103*b*, suitable for use in embodiments. Certain elements may not be present in all embodiments. A cellular radio transceiver 301 enables communication with cellular telephone network 104. An input interface 302 receives inputs from the user. Input interface 302 may include a single button or a multi-key keypad, and may include a microphone, an accelerometer, or other input devices. A display 303 may optionally be included for communicating information to the user. Display 303, if included, may comprise any means of visually communicating information to the user. For example, display 303 may comprise a backlit or passive liquid crystal display (LCD) or another kind of display capable of showing graphical or alphanumeric information. Display 303 could comprise one or more indicator lights such as indicator light 206, for example made of light emitting diodes or another kind of light source. In some embodiments, display 303 may be a touchscreen display that can receive input from the user, and may be considered to be part of input interface 302. Many other kinds of displays are possible. In some embodiments, no display may be included. The operation of the device is controlled by a microprocessor 304 executing instructions stored in a computer readable memory 305. The instructions, when executed by microprocessor 304, cause the device to perform steps in accordance with embodiments. Computer readable memory 305 may include volatile memory, non-volatile memory, reprogrammable memory, or a combination of these. Microprocessor 304 may be any suitable kind of processor, for example a complex instruction set microprocessor, a reduced instruction set microprocessor, a digital signal processor, a microcontroller, or any other circuitry or combination of components that performs similar functions. A power subsystem 306 routes power to the other components, and includes a battery 310. Connections to power subsystem 306 are omitted for clarity, but it will be recognized that battery 310 supplies power to the electronic components of the device.

Optionally, a global positioning system (GPS) receiver 307 or similar geographical location capability may be included, enabling the device to accurately determine its location. An audio system 308 may include such items as a microphone and a speaker, and may provide for audio communication with the user. Other audio functions may also be provided. A local radio transceiver 309 may be provided, for wireless communication separate from communication with cellular telephone network 104. For example, local radio transceiver 309 may include a facility for communicating in accordance with a short range wireless protocol such as BLUETOOTH®. Other examples of local radio transceivers include a Wi-Fi Transceiver®, a near field communications (NFC) transceiver, or the like. The depiction of the device in FIG. 3 is simplified, and other components may be present.

In addition to providing voice telephone calls, devices used in embodiments of the invention may be able to communicate in other ways as well. For example, cellular telephone network 104 may support data transmission, and the mobile communication device may be able to send and receive "data calls" that exchange digital data with other devices. Data calls may be used for multiple purposes. For example, a device may utilize voice over internet protocol (VOIP) technology to provide voice calls over data channels. In addition, the device may support text-based messaging such as is provided by Short Message Service (SMS) messaging. In SMS messaging, short digital messages, typically 140 characters or fewer in length, can be sent through cellular network 104, often during voice calls. SMS messages may be used for silent control and monitoring of a device such as device 103a, 207, or 103b, or for text-based communication between device users. Another possible method of communication by a device such as device 103a, 207, or 103b is the sending and receiving of dual-tone multiple-frequency (DTMF) tones over the voice communication channel. These tones are equivalent to the tones generated for dialing by a "touch tone" telephone, and can be used to communicate information during a voice call.

Microprocessor 304 can monitor many of the other components of the device, and can also control the operation of the device. For example, microprocessor 304 can learn the current level of charge in battery 310. In another example, microprocessor 304 can learn and/or control the level of transmit power being used by cellular radio 301 to communicate with cellular network 104.

The transmit power being used by cellular radio may be variable, in response to current conditions within cellular network 104. For example, if the mobile device is near a cell tower such as tower 108 of cell 109 shown in FIG. 1, the signal strength seen by the device may be high, so little transmit power may be needed for error-free communication. However, if the device is on the outskirts of a cell or communications are difficult for other reasons, the base station associated with the cell may recognize the reduced communication quality and may request that the mobile device use a higher transmit power. Because increased transmit power comes at the cost of additional drain on battery 310, the maximum duration of a telephone call (also known as "talk time") is highly dependent on the quality of signal coverage in the area of the device. For example, if a device is in good coverage, it may only consume 150 mA of current, while if it is in bad coverage it may consume over three times that amount.

Talk time is also affected by other factors, for example whether additional features of the device such as GPS receiver 307 or local radio 309 are operating, whether any processor-intensive applications are executing on processor 304, and on other factors.

During a call to response center 102, it may be very helpful for customer service representative 105 to know how long the call can be expected to be sustained. For example, during a call that requires an unusually long time, customer service representative 105 may wish to inform the calling client of the possibility that the client's device may run out of battery power before the call ends, so that the client knows that the call was not arbitrarily ended. Or as the available talk time dwindles, customer service representative 105 may be able to arrange other means for continuing the call. For example, customer service representative 105 may be able to call the client back on a landline phone that the client can reach, or on the mobile phone of another person at the client's location having more available talk time.

Figure 4:
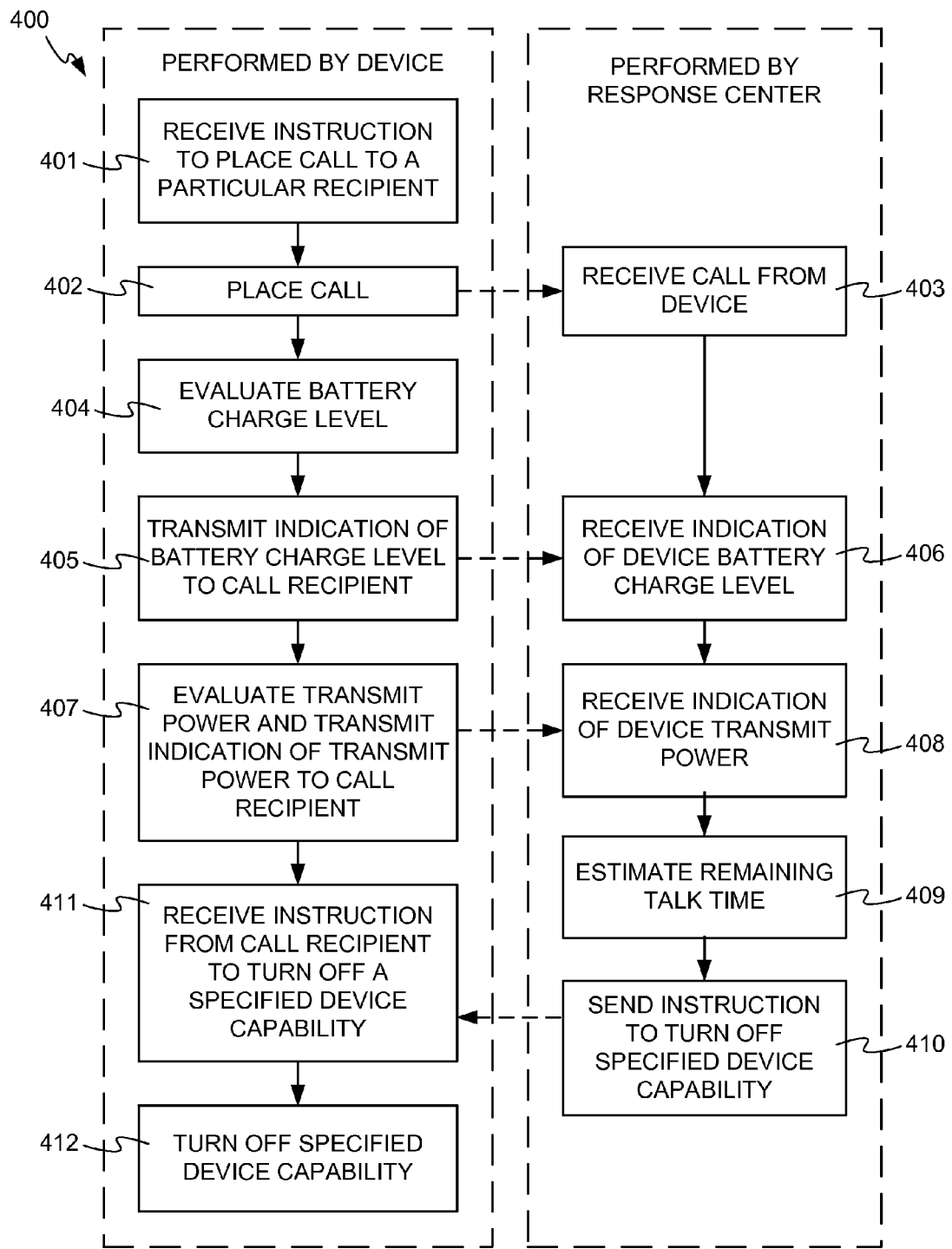
FIG. 4 illustrates methods in accordance with embodiments of the invention.

In accordance with embodiments of the invention, a mobile communications device reports information usable by response center 102 to estimate the available talk time of the device. FIG. 4 illustrates methods 400 in accordance with embodiments of the invention, in which a mobile device and response center cooperate to evaluate and increase the available talk time of the mobile device. It will be understood that not all of the steps shown in FIG. 4 may be present in all embodiments. The methods will be described as using a simplified communicator such as simplified communicator 103b, but other embodiments may use other devices, for example a smart phone such as smart phone 103a or flip phone 207.

In step 401, device 103b receives an indication from a user that a telephone call is to be placed to a particular recipient. For example, client 101b may simply press button 205 on device 103b to directly call response center 102. In other embodiments, a single short-cut button may be actuated on a conventional phone, an application may be launched on a smart phone such as device 103a causing response center 102 to be called, a phone number may be "dialed", or a call may be initiated in another way.

In step 402, the device places the call. In step 403, response center 102 receives the call. In step 404, the calling device, for example under control of processor 304, evaluates its present battery charge level. For example, the device may measure the voltage being produced by battery 310.

In step 405, the calling device transmits an indication of the charge level to the call recipient, which in this example is response center 102. For example, device may transmit a reading of the voltage being produced by battery 310. Response center 102 receives the indication in step 406. For example, device 103b may send an SMS message including an indication of the charge level. Because the SMS channel is separate from the voice channel, this method may have the advantage that it can be done during the voice call and without affecting the voice call. In other embodiments, the indication of the battery charge level may be sent using DTMF tones, a data call, a data packet, or by other means.

In step 407, the calling device evaluates the transmit power being used by its cellular radio 301 and sends an indication of the transmit power to response center 102, which receives the indication in step 408. Signal strength is often measured in decibels (dB), and the signal strength indication may include a measurement in dB. Transmit power may be measured in milliwatts, milliamperes (with an appropriate assumption about the voltage), or other convenient units. As with the battery charge indication, the transmit power indication may be sent via SMS, DTMF, or another means. In other embodiments, multiple indications may be sent in the same message to response center 102. For example, the transmitting in steps 405 and 407 may be accomplished with a single message.

In step 409, response center 102 estimates the remaining talk time of the mobile device. The estimation may be performed in any suitable way, for example using computer system 106 to apply a previously-derived formula to the battery charge level and transmit power, or to look up an expected talk time in a table based on the battery charge and transmit power. Preferably, any formula or table is prepared for the specific model of device being used by the caller. Information identifying the type of device being used may be sent from the device with the battery level or transmit power information. Or computer system 106 may maintain records of which clients use which models of devices, and may look up the device information as needed from existing records.

In step 410, response center 102 sends, for example using computer system 106, an instruction to the calling device to turn off or disable certain features. For example, the calling device may report its precise geographical location upon placing the call to response center 102. Depending on the circumstances that prompted the call, customer service representative 105 may determine that the client has been precisely located and is not moving, and that there is no more need to keep GPS receiver 307 operating for the purposes of the call. Customer service representative 105 may cause an instruction to be sent to the calling device to temporarily turn off GPS receiver 307, thus saving the power being consumed by GPS receiver 307, and extending the available talk time. This message may be sent by any suitable method, for example SMS, DTMF, a data call, or another method. If customer service representative 105 determines later in the call that additional location information about the client would be helpful, another message may be sent re-enabling GPS receiver 307, so that the device can establish and report a new position fix if necessary.

In other embodiments, the instruction of step 410 may instruct the device to turn off a secondary radio such as local radio 309, thus saving the power being consumed by local radio 309. For example, customer service representative 105 may be able to determine by questioning the client that no BLUETOOTH® devices are being used, and that it is safe to turn off a BLUETOOTH® radio. If the caller is using a wireless headset to make the call, customer service representative 105 may suggest that the caller use the phone handset to further the call, and allow the headset radio to be turned off. Similarly, other secondary radios or signals, such as WiFi, NFC (Near Field Communications), ANT, Zigbee, Z-Wave, and infrared can be also turned off to save power.

In other embodiments, the instruction of step 410 may instruct the device to terminate or suspend certain application programs, for example processor-intensive imaging or game applications that consume significant power. To facilitate a decision to terminate or suspend program execution, the mobile device may provide a list of presently-running applications upon connection of the call, similar to the battery level and transmit power indications of steps 405 and 407. In step 411, the calling device receives the instruction to turn of the specified capability, and in step 412, the device turns off the specified capability.

In other embodiments, the calling device may be instructed to turn off specific hardware capabilities to minimize power usage. For example, in the case of a simplified communicator such as device 103b, indicator light 206 may be shut off. In the case of a smart phone such as device 103a, display 201 may be a significant power drain, and may be shutoff or reduced in brightness upon instruction from response center 102, to save additional power. In addition, there may be other sensors, such as an accelerometer, magnetometer, gyroscope, digital compass, temperature, or heartbeat sensor, that can be turned off in order to save power.

In some embodiments, response center 102 may estimate the required duration of the call and compare the estimated required duration with the estimated talk time. If ample estimated talk time appears to be available, then no device capabilities may need to be turned off. However, if customer service representative 105 recognizes that a call is likely to take longer than normal, he or she may judge that device capabilities should be turned off to improve the chance that the battery of the calling device will be able to sustain the call until the situation that prompted the call is resolved. For example, continuous updates of location would be important in abduction cases, or in cases where the customer may have dementia, but not necessarily in cases where the customer has fallen and is immobile. Computer system 106 can be instructed to send the message turning off one or more capabilities of the calling device.

A further advantage of turning off capabilities of the calling device is that the predictability of the remaining talk time may be improved. The fewer power consumption variables that need to be taken into account in the estimation of talk time, the more accurate the estimation can be, and the better customer service representative 105 can keep the calling client informed about the status of the call.

In some embodiments, additional messages between the calling device and response center 102 may provide updates as to the battery charge level and transmit power being used by the device, and may enable turning off additional device capabilities as needed. Thus, customer service representative 105 may actively manage a caller's device during a call.

Figure 6:
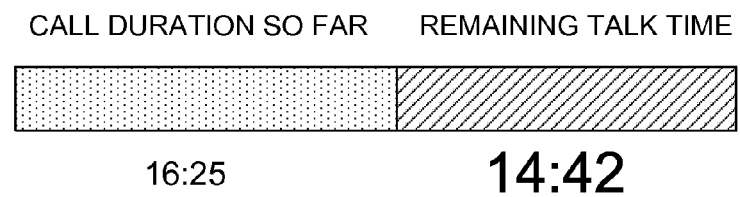
FIG. 6 illustrates an example display of remaining talk time for a mobile communications device, in accordance with embodiments of the invention.

In some embodiments, an ongoing estimate of remaining talk time may be displayed by computer system 106 for the benefit of customer service representative 105. FIG. 6 illustrates one possible format for such a display, in accordance with embodiments of the invention.

In some embodiments, device capabilities may be arranged into logical groups, and customer service representative 105 may be able to cause a message to be sent to the calling device to turn off or disable a group of capabilities. For example, a single command may disable all local radio transceivers. Another command may disable all visual capabilities of the device, for example the display screen and any cameras present. The logical groupings could also relate to different levels of power parsimony. For example, a "low" power conservation level may dim the display screen but leave the screen active, and may make other similar adjustments that are also intended to save some power but leave the device essentially fully functional. A "medium" power conservation level may turn off some visual indicators, and secondary radios. A "maximum" power conservation level may disable all device capabilities that are not necessary for voice communication, for example completely shutting off the display. Preferably, capabilities or groups of capabilities can be selectively re-enabled if it appears that one of the disabled capabilities can be helpful. For example, the device may be instructed to begin broadcasting its WiFi® SSID as a means for assisting persons to locate the client, as is described in more detail in U.S. Pat. No. 8,380,162 to Matsuo et al., titled "Extended Emergency Notification Systems and Methods" and issued Feb. 19, 2013, the entire disclosure of which is hereby incorporated by reference herein.

Figure 4A:
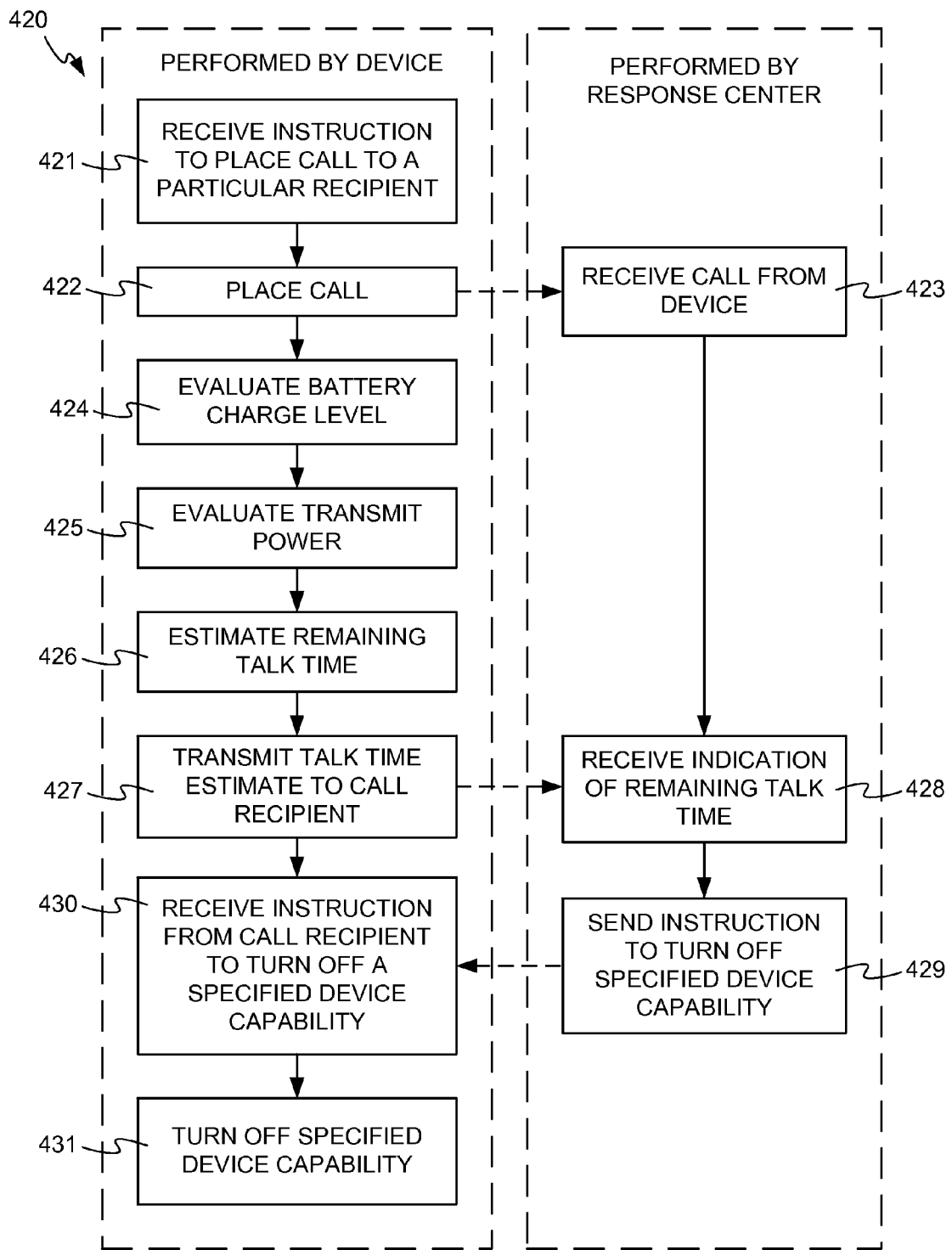
FIG. 4A illustrates methods in accordance with other embodiments of the invention.

In some embodiments, the device may make the estimate of remaining talk time and may communicate the estimate to response center 102. FIG. 4A illustrates methods 420 in accordance with such embodiments. In step 421 In step, a device such as device 103b receives an indication from a user that a telephone call is to be placed to a particular recipient. For example, client 101b may simply press button 205 on device 103b to directly call response center 102. In other embodiments, a single short-cut button may be actuated on a conventional phone, an application may be launched on a smart phone such as device 103a causing response center 102 to be called, a phone number may be "dialed", or a call may be initiated in another way.

In step 422, the device places the call. In step 423, response center 102 receives the call. In step 424, the calling device, for example under control of processor 304, evaluates its present battery charge level. For example, the device may measure the voltage being produced by battery 310. In step 425, the calling device evaluates the transmit power being used by its cellular radio 301, for example by measuring the amount of power or current being supplied to cellular radio 301. In step 426, the device estimates its remaining talk time, for example using a table lookup or formula based on the battery charge level and transmit power.

In step 427, the device transmits an indication of its remaining talk time to response center 102. The talk time estimate may be sent in any suitable way, for example via SMS, DTMF, a data call, or another method. In step 428, response center 102 receives the indication of the remaining talk time.

In step 429, response center 102 sends, for example using computer system 106, an instruction to the calling device to turn off or disable certain features. This message may also be sent by any suitable method, for example SMS, DTMF, a data call, or another method. In step 430, the device receives the message instructing it to turn off the specified capability, and in step 430, the specified capability is turned off. If customer service representative 105 determines later in the call that the disabled device capability is needed again, another message may be sent re-enabling the disabled capability.

Figure 5:
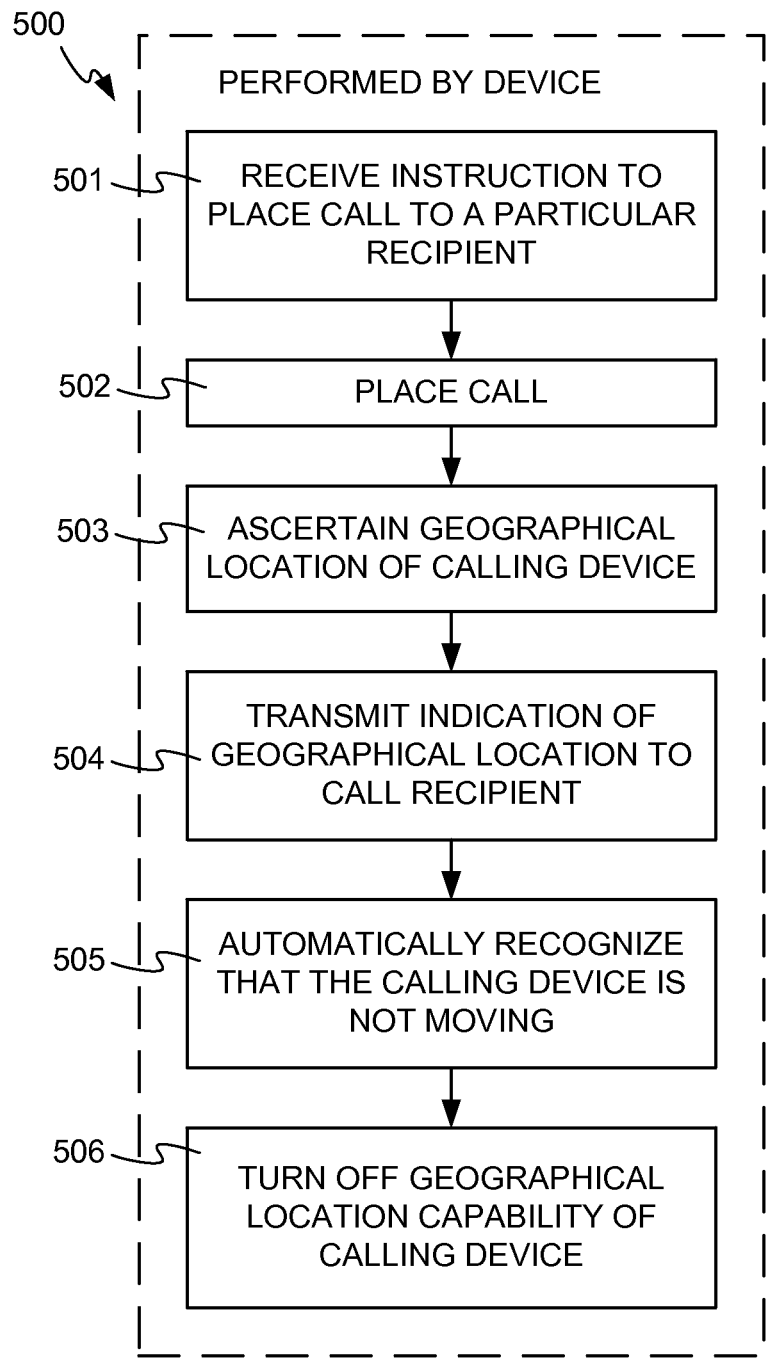
FIG. 5 illustrates a method as may be performed by a calling device in embodiments of the invention

In other embodiments, the calling device itself may make a decision to turn off certain capabilities that are consuming unnecessary power. FIG. 5 illustrates a method 500 as may be performed by the calling device such as device 103b in embodiments of the invention. In step 501, the device receives an indication from a user that a telephone call is to be placed to a particular recipient. For example, client 101b may simply press button 205 on device 103b to directly call response center 102. In other embodiments, a single short-cut button may be actuated on a conventional phone, an application may be launched on a smart phone such as device 103a causing response center 102 to be called, a phone number may be "dialed", or a call may be initiated in another way.

In step 502, the device places the call. In step 503, the calling device ascertains its geographical location. For example, the device may include a GPS receiver 307 or another kind of geographical location capability and may use that capability to determine its geographical location. In other embodiments, the device may ascertain its location by requesting a location fix from cellular network 104, which in turn may locate the device by trilateration between cellular towers. In other embodiments, the device may obtain its geographical location from a location service that provides location based on the known locations of wireless "hotspots" used for Internet access. Other location methods may be used as well. Methods of maintaining a position fix by a cellular telephone device are disclosed in U.S. Pat. No. 8,270,939 to Imming et al., titled "Systems and Methods for Identifying Caller Locations" and issued Sep. 18, 2012, the entire disclosure is hereby incorporated by reference herein.

In step 504, the calling device transmits an indication of its geographical location to the call recipient, which in this example is response center 102. In step 505, the calling device automatically recognizes that it is not moving. For example, microprocessor 304 may compare subsequent geographical location fixes and determine that no movement has occurred. In step 506, the device turns off its geographical location capability. In some embodiments, the geographical location capability may be reactivated, for example periodically, and a new determination made whether the device is in motion. If so, an updated location fix can be obtained and an indication of the updated geographical location of the device sent to the call recipient.

In other embodiments, the device may comprise an accelerometer or other component that can be used to detect motion of the device while a geographical location capability such as GPS is disabled. When motion is detected using the accelerometer or other component, the device may reactivate its geographical location capability to determine if a new location fix should be transmitted to response center 102.

While the principles of the disclosure have been described above in connection with specific apparatuses and methods, it is to be clearly understood that this description is made only by way of example and not as limitation on the scope of the disclosure.

What is claimed is:

1. A method performed by a mobile communications device, the method comprising:
   receiving from a user of the mobile communications device an indication that the mobile communications device is to place a telephone call to a particular recipient via a mobile telephone network;
   placing the telephone call to the particular recipient via the mobile telephone network;
   automatically evaluating a battery charge level of the mobile communications device;
   transmitting an indication of the battery charge level to the recipient of the telephone call via the mobile telephone network;
   automatically evaluating a transmit power being used by the mobile communications device to communicate via the mobile telephone network; and
   transmitting an indication of the transmit power to the recipient of the telephone call via the mobile telephone network;
   automatically ascertaining a geographic location of the mobile communications device;

transmitting an indication of the geographic location of the mobile communications device to the recipient of the telephone call via the mobile telephone network;

receiving, from the recipient of the telephone call via the mobile telephone network, an instruction to turn off one or more specified capabilities of the mobile communications device, wherein the instruction is sent by the recipient of the telephone call based at least in part on a comparison of an estimated required duration of the telephone call and an estimate of an amount of time the mobile communications device can sustain the telephone call without running out of power, the amount of time the mobile communications device can sustain the telephone call without running out of power being estimated from the battery charge level indication, the transmit power indication, and an anticipated level of need for additional geographic location fixes from the mobile communications device; and in response to the received instruction, turning off the one or more specified capabilities, wherein turning off the one or more specified capabilities increases the amount of time the mobile communications device can sustain the telephone call.

2. The method of claim 1, wherein the indication that the mobile communications device is to place a telephone call to a particular recipient is the press of a single button on the mobile communications device.

3. The method of claim 1, wherein turning off the one or more specified capabilities comprises turning off a geographical location capability of the mobile communications device.

4. The method of claim 1, wherein turning off the one or more specified capabilities comprises turning off a visual display of the mobile communications device.

5. The method of claim 1, wherein turning off the one or more specified capabilities comprises turning off a radio transceiver other than a mobile telephone transceiver being used to communicate via the mobile telephone network.

6. The method of claim 1, wherein turning off the one or more specified capabilities comprises terminating or suspending at least one application executing on a processor of the mobile communications device.

7. The method of claim 6, further comprising transmitting to the recipient of the telephone call a list of one or more application programs being executed by the processor of the mobile communications device.

8. The method of claim 1, further comprising:
automatically recognizing, using a satellite-based geographical location capability within the mobile communications device, that the mobile communications device is not moving; and
in response to the recognition that the mobile communications device is not moving, automatically turning off the satellite-based geographical location capability of the mobile communications device.

9. The method of claim 8, further comprising:
reactivating the satellite-based geographical location capability of the mobile communications device;
re-evaluating whether the mobile communications device is in motion; and
when the mobile communications device is in motion, ascertaining an updated geographical location of the mobile communications device and transmitting to the recipient of the telephone call an indication of the updated geographical location of the mobile communications device.

10. A method of operating a call center, the method comprising:
receiving a telephone call from a mobile communications device via a mobile telephone network;
receiving from the mobile communications device an indication of a battery charge level of the mobile communications device;
receiving from the mobile communications device an indication of a transmit power being used by the mobile communications device to communicate via the mobile telephone network;
receiving from the mobile communications device over the mobile telephone network an indication of the geographic location of the mobile communications device;
estimating, from the battery charge level indication, the transmit power indication, and an anticipated level of need for additional geographic location fixes from the mobile communications device, the amount of time the mobile communications device can sustain the telephone call without running out of power;
estimating a required duration of the telephone call and comparing the estimated required duration with the estimated amount of time the mobile communications device can sustain the telephone call; and
transmitting by the device at the call center, in reaction to the comparison, an instruction to the mobile communications device via the mobile telephone network to turn off one or more capabilities of the mobile communications device, wherein turning off one or more capabilities of the mobile communications device increases the amount of time the mobile communications device can sustain the telephone call.

11. The method of claim 10, wherein the instruction to turn off one or more capabilities of the mobile communications device is transmitted when the estimated required duration exceeds the estimated amount of time the mobile communications device can sustain the telephone call.

12. The method of claim 10, further comprising:
receiving from the mobile communications device, via the mobile telephone network, information usable to ascertain whether the mobile communications device is in motion;
wherein transmitting an instruction to the mobile communications device via the mobile telephone network to turn off one or more capabilities of the mobile communications device comprises transmitting an instruction to the mobile communications device to turn off a geographical location capability of the mobile communications device.

13. The method of claim 10, wherein transmitting an instruction to the mobile communications device via the mobile telephone network to turn off one or more capabilities of the mobile communications device comprises transmitting an instruction to the mobile communications device to turn off a visual display of the mobile communications device.

14. The method of claim 10, wherein transmitting an instruction to the mobile communications device via the mobile telephone network to turn off one or more capabilities of the mobile communications device comprises transmitting an instruction to the mobile communications device to turn off a radio transceiver other than a mobile telephone transceiver being used to communicate via that mobile telephone network.

15. The method of claim 10, wherein transmitting an instruction to the mobile communications device via the mobile telephone network to turn off one or more capabilities of the mobile communications device comprises transmitting an instruction to the mobile communications device to terminate or suspend at least one application executing on a processor of the mobile communications device.

16. The method of claim 15, further comprising receiving from the mobile communications device via the mobile telephone network a list of one or more application programs being executed by the processor of the mobile communications device.

17. A method performed by a mobile communications device, the method comprising:
- receiving from a user of the mobile communications device an indication that the mobile communications device is to place a telephone call to a particular recipient via a mobile telephone network;
- placing the telephone call to the particular recipient via the mobile telephone network;
- automatically estimating an amount of time the mobile communications device can sustain the telephone call without running out of power;
- transmitting an indication of the estimated amount of time to the recipient of the telephone call via the mobile telephone network;
- automatically ascertaining a geographic location of the mobile communications device;
- transmitting an indication of the geographic location of the mobile communications device to the recipient of the telephone call via the mobile telephone network;
- receiving, from the recipient of the telephone call via the mobile telephone network, an instruction to turn off one or more specified capabilities of the mobile communications device, wherein the instruction is sent by the recipient of the telephone call based at least in part on a comparison of an estimated required duration of the telephone call and the estimate of the amount of time the mobile communications device can sustain the telephone call without running out of power, the amount of time the mobile communications device can sustain the telephone call without running out of power being estimated from the battery charge level indication, the transmit power indication, and an anticipated level of need for additional geographic location fixes from the mobile communications device; and
- in response to the received instruction, turning off the one or more specified capabilities, wherein turning off one or more specified capabilities increases the amount of time the mobile communications device can sustain the telephone call.

18. The method of claim 17, further comprising:
- automatically evaluating a battery charge level of the mobile communications device; and
- automatically evaluating a transmit power being used by the mobile communications device to communicate via the mobile telephone network;
- wherein the amount of time is estimated from the battery charge level and transmit power.

\* \* \* \* \*